Jan. 18, 1966  E. S. DAHL ET AL  3,230,023

BEARING CONSTRUCTION

Filed May 27, 1963

INVENTORS.
EINAR S. DAHL
JOHN M. WHALEN
BY
Wheeler, Wheeler & Wheeler
ATTORNEYS.

3,230,023
BEARING CONSTRUCTION
Einar S. Dahl, Libertyville, and John M. Whalen, Waukegan, Ill., assignors to Outboard Marine Corporation, Waukegan, Ill., a corporation of Delaware
Filed May 27, 1963, Ser. No. 283,266
3 Claims. (Cl. 308—207)

The invention relates generally to anti-friction bearings.

In order to provide effective bearings in members of relatively soft material, such as aluminum, hardened steel races or liners have been pressed into bores in such members with fits sufficiently tight to prevent displacement of the races or liners relative to the bores. As a consequence, one or both of the members and the races was subject to undesirable internal stresses. In addition, due to difference in rates of thermal expansion, such stress conditions were generally intensified when the bearing became heated.

The invention provides an anti-friction bearing including a split liner or race which is frictionally engaged in a bore in a relatively soft material, and means for preventing axial and rotative displacement of the race relative to the bore when subject to forces tending to rotate the race relative to the bore.

In one preferred embodiment, the race is a split ring provided with chevron-shaped transverse ends and the means for anchoring the race comprises a projection on a set screw which extends into the bore and into an aperture in the split race located in spaced relation to the chevron-shaped ends. Use of a split ring with chevron-shaped ends serves to avoid the tendency, exhibited by split rings having mating tapering ends, to axially feed or displace the roller bearing elements during rotative operation.

The invention also provides for use, in combination with the above features, of roller bearing elements having intermediate their ends, annular grooves which serve the dual purpose of providing clearance in the event the race anchoring means projects beyond the inner surface of the race and of co-operating with releasable means in the form of a loop or hoop or wire, or other like device, to effect releasable positioning of the roller bearings in a circular series around the inner surface of the split race and in axial engagement therewith.

The invention further provides means for preventing axial displacement of the roller bearing elements both when the bearing elements are retained by the beforementioned loop and after insertion of a co-operating inner race. In one embodiment, a pair of retaining rings are seated in axially spaced, annular sockets provided in the split race. In another embodiment, a pair of retaining rings are seated in axially spaced annular sockets located in the wall of the bore in outwardly adjacent relation to the side edges of the split race, thereby limiting axial displacement of the race as well as of the bearing elements.

Other objects and advantages of the invention will become known by reference to the following description and accompanying drawings of two embodiments.

Figure 2:
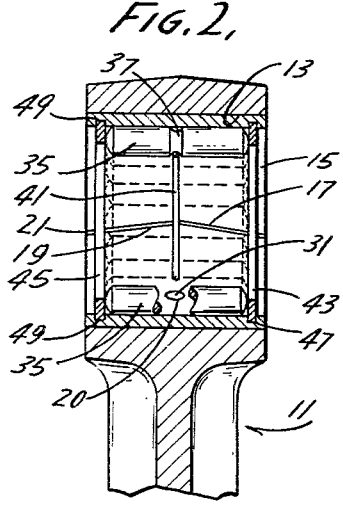
FIGURE 2 is a sectional view taken generally along line 2—2 of FIGURE 1 and with certain of the bearing elements shown in dotted outline.

The invention as exemplified in the drawings is embodied in a member 11 which is intended to journal another member (not shown) for relative rotation therebetween. For example, the member 11 could be a portion of a crankcase housing journaling a crankshaft or it could be a part of a connecting rod intended for connection with a stub crank pin or a piston pin. The member 11 is fabricated of relatively soft material, such as aluminum, which material is generally unsuited for use as a race for a series of hardened steel bearing elements, and includes a bore 13 concentric with the axis of intended relative rotation.

Situated in the bore 13 is a split race or liner 15 of relatively hard material, such as hardened steel. The split race 15 is cylindrically shaped with chevron-shaped transverse ends 17 and 19 located in adjacently spaced relation to each other and is dimensioned with a relaxed outer diameter slightly greater than that of bore 13. During assembly, the diameter of the split race 15 is slightly collapsed and the race is inserted into the bore 13, thereby snugly engaging the bore without creating significant internal stresses in either the member 11 or in the split race 15. Moreover, because of the split condition of the race 15, minor amounts of relative movement between the chevron-shaped ends 17 and 19 is permitted, thereby avoiding significant internal stresses in either the member 11 or the race 15 if and when the bearing is heated to relatively elevated temperatures.

When seated in the bore 13, the split race 15 is anchored or located against axial and rotative movement relative to the bore 13 by means including a pin or projection extending into the bore 13 and into locking engagement with the split race 15. In the specifically disclosed construction, such locating pin means projects into socket means in the split race 15, which socket means can take the form of an aperture or opening 20 located in spaced relation from the chevron-shaped ends 17 and 19. Engagement of the locating pin or projection in the aperture 20 prevents both rotative and axial displacement of the split race 15 relative to the member 11.

Various arrangements can be employed to provide the locating pin. In the disclosed embodiment, the member 11 includes a second or transverse bore 25 which extends radially of the bore axis, intersecting the bore 13 midway of its length. The bore 25 is counterbored and threaded, as shown at 27. Threadedly received in the counter bore 27 is a set screw 29 having an inwardly projecting end part 31 extending through the transverse bore 25 and into the bore 13. Preferably, the outer extremity of the end part 31 is fabricated so that the side surface engaging the split race 15 extends generally radially with respect to the axis of the bore 13. The set screw 29 also includes a second or outer end part available from the exterior of the member 11 to afford threading of the said screw axially of the bore 25.

Figure 1:
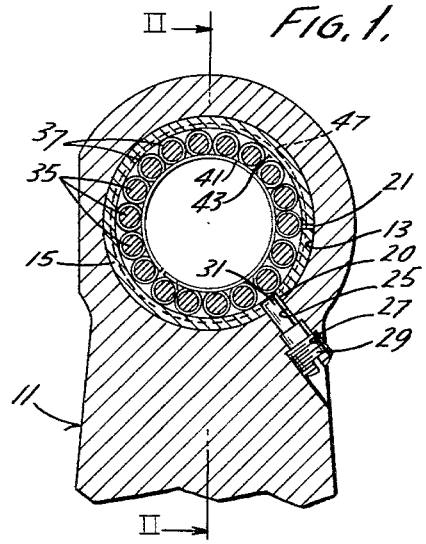
FIGURE 1 is a fragmentary elevational view, partially in section, of one embodiment of a portion of an anti-friction bearing arrangement in accordance with the invention.

Also forming a part of the anti-friction bearing shown in FIGURES 1 and 2 is a plurality of needle or roller bearing elements 35 of hardened steel. Means are provided for assembling and retaining the roller bearing elements 35 in a circular series around the inner surface of the split race 15 and in axial engagement therewith. Such means includes, in each bearing element midway of its length, a transverse annular groove 37 which is preferably arcuately concave in cross section. The grooves 37 are preferably located so as also to provide clearance for the projecting end part 31 in the event that the end part extends slightly inwardly of the split race 15.

The assembling and retaining means also includes a loop or hoop 41 of wire which engages the grooves 37 of the roller bearing elements to retain them against the race 15. Such engagement also serves to limit axial displacement of the roller bearing elements relative to the race. The wire 41 is sufficiently rigid to retain the roller bearing elements against the race, yet is sufficiently flexible so that when an inner race (not shown) is axially inserted, the wire loop 41 may be dislodged and ejected from the resulting anti-friction bearing if no longer needed. More particularly, if the thickness of the loop is less than the depth of the groove, then the loop can be left in the groove, notwithstanding the insertion of an inner race. While a wire loop has been disclosed, other materials or devices can be employed. The bearing will, however, function properly either with or without the loop.

Axial displacement of the roller bearing elements 35 is limited, both when the elements are retained in position by the loop 41 and during subsequent rotative operation, by means of a pair of retainer rings which extend radially of the bearing axis. In the embodiment shown in FIGURES 1 and 2, rings 43 and 45 are respectively retained in annular transverse sockets or cutouts 47 and 49 formed in the split race 15. The rings 43 and 45 are assembled with the race 15 by temporarily expanding the race to permit interfitting of the rings 43 and 45 into the sockets 47 and 49.

Figure 4:
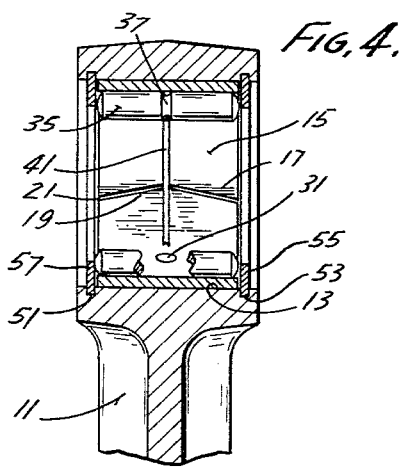
FIGURE 4 is a sectional view taken generally along line 4—4 of FIGURE 3 and with certain of the bearing elements omitted.
Figure 3:
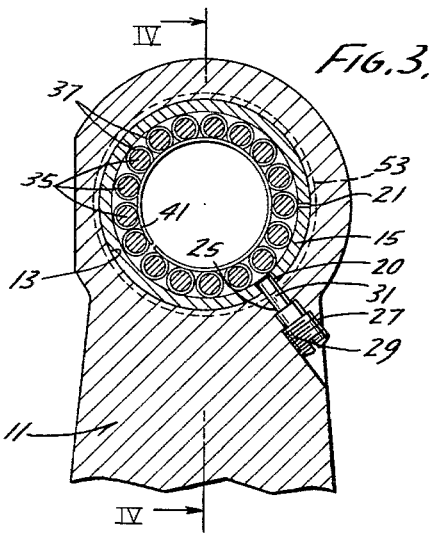
FIGURE 3 is a fragmentary elevational view, partially in section, of a second embodiment of a portion of an anti-friction bearing arrangement in accordance with the invention.
Figure 5:
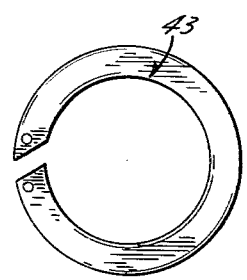
FIGURE 5 is a side elevational view of one of the snap rings incorporated in the embodiment shown in FIGURES 3 and 4.

In the embodiment shown in FIGURES 3 and 4, the bore 13 is provided with a pair of axially spaced annular sockets 51 and 53 which are disposed adjacent to the side edges of the split race 15. Rings 55 and 57 are provided by a pair of conventional snap ring elements. In assembly, the outer diameter of the snap ring elements is temporarily reduced to facilitate insertion into the sockets 51 and 53. The rings 43 and 45 and 55 and 57 have sufficient radial extent to obstruct axial movement of the roller bearing elements 35. In the construction shown in FIGURES 3 and 4, the snap rings 55 and 57 can also serve to limit or prevent axial displacement of the split ring 15.

Various of the features of the invention are set forth in the following claims.

What is claimed is:

1. The combination of a first member intended for rotation relative to a second member, said member having a first bore therein concentric with the axis of intended relative rotation, a pair of axially spaced parallel annular sockets in the wall of said first bore, and a second bore extending transversely of said first bore and intersecting said first bore intermediate the ends thereof and between said sockets, an integral hardened split race in engagement with said bore, said race having a chevron shaped end and having socket means therein, an element in said second bore, said element having a part extending into said first bore and into said socket means, a series of roller bearings, each of said roller bearings having intermediate its ends and in alignment with said socket means a transverse annular groove in its outer surface whereby clearance from said roller bearings is provided for said part extending into said socket means, means releasably engaged in said grooves for locating said elements around the inner surface of said race in axially extending engagement therewith, and respective snap rings in each of said sockets, said snap rings having sufficient radial extent to obstruct axial movement of said race and said roller bearings.

2. A combination in accordance with claim 1 wherein said first member is fabricated of aluminum and said split race is fabricated of hardened steel.

3. The combination of a first member intended for rotation relative to a second member, said first member having a bore therein concentric with the axis of intended relative rotation, a hardened split race in engagement with said bore, a series of roller bearing elements each having, intermediate the ends, a transverse annular groove in its outer surface of said roller bearing elements, means disposing said elements around the inner surface of said race in axially extending engagement therewith, and means extendable into said bore in axially aligned relation with said grooves in said roller bearing elements for locating said race within said bore whereby said grooves in said roller bearing elements provide clearance for said means for locating said race within said bore.

References Cited by the Examiner

UNITED STATES PATENTS

| | | | |
|---|---|---|---|
| 976,476 | 11/1910 | Lockwood | 308—216 X |
| 1,174,952 | 3/1916 | Adam | 308—216 X |
| 1,190,965 | 7/1916 | Sparr | 308—216 |
| 1,512,020 | 10/1924 | Graham | 308—213 |
| 1,577,480 | 3/1926 | McKamey | 308—216 X |
| 1,640,228 | 8/1927 | Adams | 308—244 |
| 1,651,815 | 12/1927 | Gibbons | 308—216 |
| 1,885,914 | 11/1932 | Heim | 308—212 X |
| 2,016,924 | 10/1935 | Herrmann | 308—216 X |
| 2,141,122 | 12/1938 | Boden | 308—216 X |
| 2,334,227 | 11/1943 | Stallman | 308—212 |
| 2,578,711 | 12/1951 | Martellotti | 308—122 |
| 2,614,897 | 10/1952 | Kircher | 308—35 |
| 2,624,645 | 1/1953 | Virtue | 308—216 |
| 2,956,642 | 10/1960 | Chaplin et al. | 308—122 |
| 3,007,754 | 11/1961 | Cross | 308—237 |

DON A. WAITE, *Primary Examiner.*

ROBERT C. RIORDON, *Examiner.*